US012790514B2

(12) United States Patent
Meckel-Jonas et al.

(10) Patent No.: US 12,790,514 B2
(45) Date of Patent: Nov. 10, 2026

(54) FLAME-RETARDANT ADHESIVE COMPOSITION FOR STRUCTURAL WOOD BONDING

(71) Applicant: Henkel AG & Co. KGaA, Duesseldorf (DE)

(72) Inventors: Claudia Meckel-Jonas, Duesseldorf (DE); Uwe Franken, Dormagen (DE); Patrick Thebille, Solingen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 216 days.

(21) Appl. No.: 18/546,313

(22) PCT Filed: Jan. 21, 2022

(86) PCT No.: PCT/EP2022/051298

§ 371 (c)(1),
(2) Date: Aug. 14, 2023

(87) PCT Pub. No.: WO2022/179772

PCT Pub. Date: Sep. 1, 2022

(65) Prior Publication Data

US 2024/0150616 A1 May 9, 2024

(30) Foreign Application Priority Data

Feb. 26, 2021 (EP) .................................... 21159469

(51) Int. Cl.

| | |
|---|---|
| ***C09J 4/00*** | (2006.01) |
| ***C08G 18/10*** | (2006.01) |
| ***C08G 18/12*** | (2006.01) |
| ***C08G 18/30*** | (2006.01) |
| ***C08G 18/48*** | (2006.01) |
| ***C08G 18/50*** | (2006.01) |
| ***C08G 18/76*** | (2006.01) |
| ***C09J 175/06*** | (2006.01) |

(52) U.S. Cl.

CPC ................ *C09J 4/00* (2013.01); *C08G 18/10* (2013.01); *C08G 18/12* (2013.01); *C08G 18/307* (2013.01); *C08G 18/4812* (2013.01); *C08G 18/482* (2013.01); *C08G 18/4825* (2013.01); *C08G 18/485* (2013.01); *C08G 18/5021* (2013.01); *C08G 18/5084* (2013.01); *C08G 18/7664* (2013.01); *C08G 18/7671* (2013.01); *C09J 175/06* (2013.01)

(58) Field of Classification Search

CPC ........... C09J 4/00; C09J 175/06; C08G 18/10; C08G 18/12; C08G 18/307; C08G 18/4812; C08G 18/482; C08G 18/4825; C08G 18/485; C08G 18/5021; C08G 18/5084; C08G 18/7671; C08G 18/7664

See application file for complete search history.

(56) References Cited

U.S. PATENT DOCUMENTS

| | | | |
|---|---|---|---|
| 4,623,709 | A | 11/1986 | Bauriedel |
| 6,515,164 | B1 | 2/2003 | Bolte et al. |
| 6,903,167 | B2 | 6/2005 | Bolte et al. |
| 9,840,581 | B2 | 12/2017 | Diehl et al. |
| 2007/0129525 | A1 | 6/2007 | Eichelmann et al. |
| 2016/0032045 | A1 | 2/2016 | Diehl et al. |

FOREIGN PATENT DOCUMENTS

| | | | | | |
|---|---|---|---|---|---|
| CN | 102066448 | B | * | 4/2013 | ............. C08G 18/10 |
| CN | 110105528 | A | | 8/2019 | |
| CN | 111808570 | A | | 10/2020 | |
| DE | 102013204550 | A1 | | 9/2014 | |
| EP | 0150444 | B1 | | 2/1990 | |
| EP | 0951493 | B1 | | 6/2001 | |
| EP | 1341832 | B1 | | 10/2016 | |
| JP | 11-263906 | A | * | 9/1999 | |
| WO | 2005097861 | A1 | | 10/2005 | |
| WO | 2017083468 | A1 | | 5/2017 | |

OTHER PUBLICATIONS

Written Opinion of the ISA.*
International Search Report for International Patent Application No. PCT/EP2022/051298; Mailing Date: May 3, 2022.

* cited by examiner

*Primary Examiner* — Rabon A Sergent
(74) *Attorney, Agent, or Firm* — Sun Hee Thomas

(57) ABSTRACT

The present invention relates to a flame-retardant adhesive composition comprising a reactive polyurethane prepolymer, in particular a one-component flame-retardant adhesive composition, and to the use of the adhesive composition for the structural bonding of wood substrates.

16 Claims, No Drawings

FLAME-RETARDANT ADHESIVE COMPOSITION FOR STRUCTURAL WOOD BONDING

TECHNICAL FIELD

The present invention relates to a flame-retardant adhesive composition comprising a reactive polyurethane prepolymer, in particular, a one-component flame-retardant adhesive composition, and to the use of the adhesive composition for the structural bonding of wood substrates.

BACKGROUND

Wood adhesives play an important role in the current industrial wood construction. Adhesives can be used to build light and strong structures and to moderate the expansion and contraction that comes with the inherent moisture retention of wood. The industrial wood adhesives have been tailored to meet the needs of the wood industry and are constantly evolving.

Adhesives are used under controlled conditions in the production of structural wood products. These products include finger-jointed sawn timber, glulam, laminated logs, cross laminated timber, plywood, and laminated veneer lumber.

Common adhesives used in bonding structural wood include phenol-based phenol-formaldehyde (PF), phenol-resorcinol-formaldehyde (PRF), resorcinol-formaldehyde adhesive (RF), amino resin-based (melamine-urea-formaldehyde adhesive (MUF)), moisture-curing polyurethane adhesive (PU or PUR) and emulsion polymer isocyanate adhesive (EPI).

Among others, one-component polyurethane adhesives are used in the production of finger joints, glulam, laminated logs, and cross laminated timber. Such polyurethane adhesive is also used to bond layers of laminated veneer lumber sheets. Such polyurethane adhesives when bonding wood substrates cure when exposed to moisture at room temperature and create a duroplastic adhesive joint.

However, polyurethane adhesives lack heat and fire resistance and quickly lose their strength due to softening although they are superior to MUF and EPI based adhesives in many other aspects. If the adhesive inside an engineered wood product is softened, decomposed and burnt at elevated temperatures during a fire, the wood product structure would fail even if the integrity of the wood sections remains relatively intact. Therefore, to have an overall good performing adhesive in future, the fire resistance of polyurethane adhesives used in wooden constructions have to be improved.

Attempts have been made to improve the fire resistance of polyurethane adhesives for the application of engineered wood by incorporating liquid flame retardants as additive. However, these flame retardants are either low molecular weight plasticizers that lower the bonding strength or halogenated flame retardants that are under concern due to the toxic gases caused in a fire.

The fire resistance of polyurethane adhesives can also be improved by incorporating solid flame retardants, such as aluminum trihydrate, ammonium polyphosphate, melamine isocyanurate, borates and others. However, the solid flame retardants have the disadvantage of destroying the rheological properties of the adhesive and the storage stability as sedimentation of the solid additives is difficult to prevent in the relatively low viscous adhesive systems.

SUMMARY OF THE INVENTION

In light of the efforts described in the prior art, the object of the present invention lies in the provision of a flame-retardant reactive polyurethane prepolymer and an adhesive composition comprising the same which can be used for bonding wood substrates and has improved fire resistance without compromising on adhesion properties, durability of bond, storage stability of the adhesive composition.

It was surprisingly found that the above object is solved by employing a flame-retardant adhesive composition comprising a reactive polyurethane prepolymer having divalent phosphonic or phosphoric ester groups in structural wood bonding applications.

In a first aspect, the present invention therefore relates to a flame-retardant adhesive composition comprising a reactive polyurethane prepolymer comprising:

at least one, preferably two or more isocyanate end groups and at least one, preferably two or more divalent phosphonic or phosphoric ester groups, wherein the phosphor content of the reactive polyurethane prepolymer is larger than 0.3 wt % and less than 2.0 wt % based on the weight of the reactive polyurethane prepolymer.

In another aspect, the present invention relates to a one-, two- or multiple-component polyurethane adhesive composition, comprising the reactive polyurethane prepolymer according to the present invention.

In yet another aspect, the present invention relates to a method for the production of an article, the method comprising the steps of applying a flame retardant polyurethane adhesive composition according to the present invention to the surface of a first substrate and connecting the surface of the first substrate to the surface of a second substrate, in which at least one of the surface are made of wood, and to an article obtained by the method.

In yet another aspect, the present invention relates to the use of a flame-retardant adhesive composition or the article according to the present invention in structural bonding, preferably for wood materials.

Other features and aspects of the subject matter are set forth in greater detail below.

It is to be understood by one of ordinary skill in the art that the present discussion is a description of exemplary embodiments only, and is not intended as limiting the broader aspects of the present invention.

Herein, "comprising" means that other steps and other components which do not affect the end result can be added. This term encompasses the terms "consisting of" and "consisting essentially of".

Unless indicated otherwise, the molecular weights indicated in the present text refer to the number average of the molecular weight (Mn). The molecular weight Mn can be determined based on an end group analysis (hydroxyl number according to DIN 53240-1:2013-06 or NCO content according to EN ISO 11909), or by means of gel permeation chromatography (GPC) according to DIN 55672-1:2007-08 with THE as an eluent. Except where indicated otherwise, the listed molecular weights are those which are determined by means of GPC. The weight average of the molecular weight Mw can also be determined by means of GPC, as indicated previously.

In relation to an ingredient, the expression "at least one" refers to the type of ingredient and not to the absolute number of molecules. "At least one polyol" thus means, for example, at least one type of polyol, i.e., that one type of polyol or a mixture of a plurality of different polyols can be used. Together with weight data, the expression refers to all compounds of the indicated type that are contained in the composition/mixture, that is to say that the composition does not contain any other compounds of this type beyond the indicated amount of the corresponding compounds.

Unless explicitly indicated otherwise, all percentages that are cited in connection with the compositions described herein refer to wt. % with respect to the relevant mixture.

DETAILED DESCRIPTION OF THE INVENTION

The flame-retardant adhesive composition according to the present invention comprises a reactive polyurethane prepolymer having at least one, preferably at least two isocyanate end groups and at least one, preferably at least two divalent phosphonic or phosphoric ester groups. Surprisingly, the inventors have found that if the phosphorus content of the reactive polyurethane prepolymer is in the range of larger than 0.3 wt % and less than 2.0 wt % based on the weight of the polyurethane prepolymer, as measured by ICP-MS (inductively coupled plasma mass spectrometry), it can achieve an improved fire resistance (flame retardancy) as well as good adhesion properties, durability of bond, storage stability, and heat resistance for the adhesive composition comprising the reactive polyurethane prepolymer.

In one preferred embodiment, the phosphorus content of the reactive polyurethane prepolymer is from 0.5 to 1.8 wt %, preferably from 0.7 to 1.4 wt %, and in particular 0.7 to 1.1 wt %, based on the weight of the reactive polyurethane prepolymer. Such a lower amount of phosphorus content contained in the prepolymer also ensures that the environmental concern on the organo-phosphorus from products containing flame retardant adhesive can be decreased.

The flame-retardant reactive polyurethane prepolymer may be linear, branched or cyclic in structure. The prepolymer comprises at least one isocyanate end group, preferably two or more isocyanate end group. The isocyanate end group can react with moisture or a catalyst such as amine or polyol to render the prepolymer to cure as an adhesive. In one embodiment, the isocyanate end group is a residual group of polyisocyanates having two or more, preferably three or more isocyanate groups.

Suitable monomeric di- or triisocyanates are selected from the group consisting of 2,4- and 2,6-toluylene diisocyanate and any mixtures of these isomers (TDI), 4,4'-, 2,4'- and 2,2'-diphenylmethane diisocyanate and any mixtures of these isomers (MDI), mixtures of MDI and MDI homologs (polymeric MDI or PMDI), allophanate-modified diphenylmethane diisocyanate (MDI), carbodiimide-modified diphenylmethane diisocyanate (MDI), uretdione-modified diphenylmethane diisocyanate (MDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODI), dianisidine diisocyanate (DADI), 1,3,5-tris-(isocyanatomethyl)benzene, tris-(4-isocyanatophenyl)methane and tris-(4-isocyanatophenyl)thiophosphate, 1,4-tetramethylene diisocyanate, 2-methylpentamethylene-1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine and lysine ester diisocyanate, cyclohexane-1,3- and -1,4-diisocyanate, 1-methyl-2,4- and -2,6-diisocyanatocyclohexane and any mixtures of these isomers (HTDI or HsTDI), 1-isocyanato-3,3,5-trimethyl-5-isocyanatomethyl cyclohexane (isophorone diisocyanate or IPDI), perhydro-2,4'- and -4,4'-diphenylmethane diisocyanate (HMDI or $H_{12}$MDI), 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1,3- and -1,4-xylylene diisocyanate (m- and p-TMXDI), bis(1-isocyanato-1-methylethyl)naphthalene, dimer- and trimer fatty acid isocyanates such as 3,6-bis(9-isocyanatononyl)-4,5-di-(1-heptenyl)cyclohexene (dimeryl diisocyanate) and α,α,α',α',α",α"-hexamethyl-1,3,5-mesitylene triisocyanate as well as mixtures thereof.

Aliphatic, cycloaliphatic, or aromatic isocyanates may in principle be used, but aromatic polyisocyanates are particularly suitable on account of the reactivity. Examples of preferred polyisocyanates are MDI or polymeric MDI.

According to the present invention, the isocyanate group terminated polyurethane prepolymer contains at least one divalent phosphorous-containing ester group in the polymer chain. The divalent phosphorous-containing ester group can be monomeric, oligomeric or polymeric, and are the residual of mono-, bi- or higher functional amino or hydroxyl functionalized phosphinic, phosphonic, phosphoric esters.

In one embodiment, the divalent phosphorous-containing ester group is a divalent phosphonic or phosphoric ester group, each independently selected from the group consisting of Formulae (1) and (3)

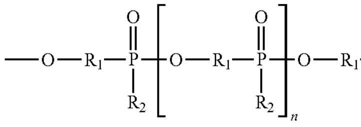

(1)

wherein n is an average chain length of from 0 to 10, $R_2$ is $CH_3$, $CH_2CH_3$, $CH_2CH_2CH_3$, $CH_2(CH_3)_2$, $CH_2(CH_2)_2CH_3$, $CH_2CH(CH_3)_2$, $C(CH_3)_3$, $C_6H_5$, $CH_2$—$C_6H_5$, $OCH_3$, $OCH_2CH_3$, $O(CH_2)_2CH_3$, $OCH(CH_3)_2$, $O(CH_2)_3CH_3$, $OCH_2CH(CH_3)_2$, $OC(CH_3)_3$, O—$CH_5$, or O—$CH_2$—$C_6H_5$, and $R_1$ is a moiety of Formula (2),

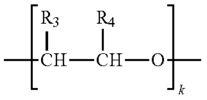

(2)

wherein k is an average chain length of from 1 to 5, $R_3$ and $R_4$, are identical or different and, independently of one another, are H, $CH_3$, $CH_2CH_3$, $CH_2CH_2CH_3$, $CH(CH_3)_2$, $CH_2(CH_2)_2CH_3$, $CH_2CH(CH_3)_2$, $C(CH_3)_3$, $C_6H_5$, or $CH_2$—$C_6H_5$, and preferably is H, $CH_3$, $CH_2CH_3$, or $CH_2CH_2CH_3$;

(3)

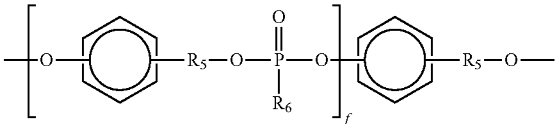

wherein f is an average chain length of from 1 to 10, $R_6$ is $CH_3$, $CH_2CH_3$, $CH_2CH_2CH_3$, $CH_2(CH_3)_2$, $CH_2(CH_2)_2CH_3$, $CH_2CH(CH_3)_2$, $C(CH_3)_3$, $C_6H_5$, or $CH_2—C_6H_5$; $OCH_3$, $OCH_2CH_3$, $O(CH_2)_2CH_3$, $OCH(CH_3)_2$, $O(CH_2)_3CH_3$, $OCH_2CH(CH_3)_2$, $OC(CH_3)_3$, $O—C_6H_5$, or $O—CH_2—C_6H_5$, and $R_5$ is a single bond, $CH_2$, $CH_2CH_2$, $CH_2CH_2CH_2$, $CH(CH_3)_2$, $CH_2(CH_2)_2CH_2$, $CH_2CH(CH_3)_2$, $C_6H_4$, $CH_2—C_6H_4$, $C(CH_3)_2—C_6H_4$.

In one preferred embodiment, the divalent phosphonic or phosphoric ester group is a residual group of methylphosphonic ethylene glycol polyesters, ethylphosphonic propylene glycol polyesters, propylphosphonic ethylene glycol polyesters, butylphosphonic ethylene glycol polyesters, methylphosphonic propylene glycol polyesters, ethylphosphonic propylene glycol polyesters, propylphosphonic propylene glycol polyesters, butylphosphonic propylene glycol polyesters, methylphosphoric ethylene glycol polyesters, ethylphosphoric propylene glycol polyesters, propylphosphoric ethylene glycol polyesters, butylphosphoric ethylene glycol polyesters, methylphosphoric propylene glycol polyesters, ethylphosphoric propylene glycol polyesters, propylphosphoric propylene glycol polyesters, or butylphosphoric propylene glycol polyesters.

The reactive polyurethane prepolymer may also contain at least one divalent residual group of polyol containing no phosphor.

Such polyols used for producing the prepolymer may be all polyols that are usually used for polyurethane synthesis, for example polyester polyols, polyether polyols, polyester ether polyols, polycarbonate polyols or mixtures of two or more thereof.

Polyether polyols may be produced from a plurality of alcohols, which contain one or more primary or secondary alcohol groups. As an initiator for the production of polyethers that do not contain any tertiary amino groups, the following compounds or mixtures of said compounds can be used by way of example: water, ethylene glycol, propylene glycol, glycerol, butanediol, butanetriol, trimethylolethane, pentaerythritol, hexanediol, 3-hydroxyphenol, hexenetriol, trimethylolpropane, octanediol, neopentyl glycol, 1,4-hydroxymethyl cyclohexane, bis(4-hydroxyphenyl)dimethylmethanes, sorbitol, and aromatic polyols such as hydroquinone or a naphthalenepolyol. Ethylene glycol, propylene glycol, glycerol and trimethylolpropane are preferably used, particularly preferably ethylene glycol and propylene glycol, and, in a particularly preferred embodiment, propylene glycol is used.

As cyclic ethers for producing the above-described polyethers, alkylene oxides such as ethylene oxide, propylene oxide, butylene oxide, epichlorohydrin, styrene oxide or tetrahydrofuran or mixtures of these alkylene oxides may be used. Propylene oxide, ethylene oxide or tetrahydrofuran or mixtures thereof are preferably used. Propylene oxide or ethylene oxide or mixtures thereof are preferably used. Propylene oxide is most particularly preferably used.

Polyester polyols can be produced for example by reacting low molecular weight alcohols, in particular ethylene glycol, diethylene glycol, neopentyl glycol, hexanediol, butanediol, propylene glycol, glycerol, or trimethylolpropane with caprolactone. 1,4-hydroxymethylcyclohexane, 2-methyl-1,3-propanediol, 1,2,4-butanetriol, triethylene glycol, tetraethylene glycol, polyethylene glycol, dipropylene glycol, polypropylene glycol, dibutylene glycol and polybutylene glycol are also suitable as polyfunctional alcohols for producing polyester polyols.

Further suitable polyester polyols may be produced by polycondensation. Difunctional and/or trifunctional alcohols having an insufficient amount of dicarboxylic acids or tricarboxylic acids or mixtures of dicarboxylic acids or tricarboxylic acids, or reactive derivatives thereof, may thus be condensed to form polyester polyols. Suitable dicarboxylic acids are, for example, adipic acid or succinic acid or dodecanedioic acid and higher homologs thereof having up to 16 carbon atoms, also unsaturated dicarboxylic acids such as maleic acid or fumaric acid and aromatic dicarboxylic acids, in particular isomeric phthalic acids, such as phthalic acid, isophthalic acid or terephthalic acid. Suitable tricarboxylic acids are for example citric acid or trimellitic acid. The aforementioned acids can be used individually or as mixtures of two or more thereof. Particularly suitable alcohols are hexane diol, butane diol, ethylene glycol, diethylene glycol, neopentyl glycol, 3-hydroxy-2,2-dimethylpropyl-3-hydroxy-2,2-dimethylpropanoate or trimethylolpropane or mixtures of two or more thereof. Polyester polyols having a high molecular weight include for example the reaction products of polyfunctional, preferably difunctional, alcohols (optionally together with small amounts of trifunctional alcohols) and polyfunctional, preferably difunctional carboxylic acids. Instead of free polycarboxylic acids, the corresponding polycarboxylic acid anhydrides or corresponding polycarboxylic acid esters can also be used (where possible) with alcohols having preferably 1 to 3 carbon atoms. The polycarboxylic acids can be aliphatic, cycloaliphatic, aromatic or heterocyclic, or both. They can optionally be substituted, for example by alkyl groups, alkenyl groups, ether groups or halogens. Suitable polycarboxylic acids are, for example, succinic acid, adipic acid, suberic acid, azelaic acid, sebacic acid, dodecanedioic acid, phthalic acid, isophthalic acid, terephthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimer fatty acid or trimer fatty acid, or mixtures of two or more thereof.

Polyesters that can be obtained from lactones, for example based on epsilon-caprolactone, also referred to as “polycaprolactone”, or hydroxycarboxylic acids, for example omega-hydroxy caproic acid, can also be used.

However, polyester polyols of oleochemical origin can also be used. Polyester polyols of this kind can be produced, for example, by complete ring opening of epoxidized triglycerides of a fat mixture that contains an at least partially olefinically unsaturated fatty acid and has one or more alcohols having 1 to 12 carbon atoms and subsequent partial transesterification of the triglyceride derivatives to form alkyl ester polyols having 1 to 12 carbon atoms in the alkyl group.

Polycarbonate polyols can be obtained, for example, by reacting diols such as propylene glycol, butanediol-1,4 or hexanediol-1,6, diethylene glycol, triethylene glycol or tetraethylene glycol or mixtures of said diols with diaryl carbonates, for example diphenyl carbonates, or phosgene.

Polyurethane prepolymers may be produced in a known manner from the above-mentioned polyols including the non-phosphor containing polyol and the phosphonic or phosphoric ester having at least one, preferably at least two hydroxyl groups, with polyisocyanates. A prepolymer containing isocyanate groups may here be produced from the polyols and isocyanates. Examples thereof are described in EP-A 951493, EP-A1341832, EP-A 150444, EP-A 1456265 and WO 2005/097861.

In one embodiment, the flame-retardant reactive polyurethane prepolymer can be obtained by reacting the compounds comprising:

i) a polyisocyanate compound;

ii) a non-phosphor containing polyol; and iii) a phosphonic or phosphoric ester having at least two hydroxyl groups.

The polyisocyanate compound can be those as described above, and is preferably MDI or polymeric MDI.

The non-phosphor containing polyol can be those as described above, and is preferably polyethylene glycol, polypropylene glycol, or combination thereof.

The molecular weight of the polyols used for synthesizing the prepolymer is preferably in the range of from 100 to 20000 g/mol, in particular 330 to 4,500 g/mol. The average functionality can be in the range of from 2 to 4.5.

The phosphonic or phosphoric esters having at least two hydroxyl groups correspond to those whose residuals are represented by Formulae (1) and (3) described above.

It is particularly preferable to use the commercially available products Exolit OP 550, Exolit OP 560, and Exolit OP 570 from Clariant Corporation.

In another embodiment, the flame-retardant reactive polyurethane prepolymer can be prepared by the method comprising the steps:

1) providing a mixture comprising a non-phosphors-containing polyol and a phosphonic or phosphoric ester having at least two hydroxyl groups; and 2) adding a polyisocyanate to the mixture to obtain the polyurethane prepolymer.

The corresponding prepolymers usually have an NCO content of from 5 to 25 wt. % (determined according to Spielberger, DIN EN ISO 11909:2007-05), preferably 10 to 20 wt. %, and have an average NCO functionality of from 1 to 4, in particular 2 to 3.

The molecular weight (Mn) of the prepolymer is in the range of from 300 to 20000 g/mol, preferably less than 12000, in particular less than 8000 g/mol.

The polyurethane prepolymer has a relatively lower viscosity of from 1000 to less than 10000 mPas, and preferably from 3500 to 9000 mPas determined at 23° C. according to DIN EN ISO 2555:2000-01. If the viscosity exceeds the above range, it will be difficult to easily mix the prepolymer with additives in the adhesive composition and the adhesive composition may not be easily applied.

The adhesive composition suitable for the invention can be one-, two- or multiple-component adhesive composition, and more preferably is a one-component adhesive composition. The crosslinking of the polyurethane adhesive compositions that are suitable for the invention is based on the reaction of reactive isocyanate groups in the prepolymer with H-acidic functional groups, for example OH groups, amino groups or carboxyl groups. An alternative crosslinking method involves the reaction of the NCO groups with moisture from the applied adhesive composition, the substrate, or the surroundings with formation of urea groups. These crosslinking reactions are known and they may also proceed concurrently. In order to accelerate reactions of this kind, catalysts can be introduced into the adhesive, for example amine, titanium or tin catalysts.

In preferred embodiments, the polyurethane adhesive composition is a one-component polyurethane adhesive composition. An adhesive composition of this kind may contain at least one NCO-terminated polyurethane prepolymer as the resin component and cures by reaction of the NCO groups with moisture from the applied adhesive composition, the substrate, or the surroundings.

The described adhesive compositions contain the above-described prepolymers for example in amounts of from 20 to 95 wt. %, preferably 50 to 95 wt. %, more preferably 70 to 90 wt. %, based on the total weight of the adhesive composition.

The adhesive compositions according to the invention may also contain additives. The additional components are, for example, flame retardants, levelling agents, fillers, defoamers, blowing catalysts, optical brighteners, adhesion promoters, crosslinking agents, pigments, stabilizers, rheology modifiers and antioxidants.

For example, known metalorganic and/or amine catalysts in amounts up to 2%, for example the metalorganic compounds of tin, iron, titanium, or bismuth, such as tin(II) salts of carboxylic acids or the dialkyltin(IV) carboxylates, are suitable as catalysts. For example, antioxidants, such as the commercially available sterically hindered phenols and/or thioethers and/or substituted benzotriazoles, or the sterically hindered amines of the HALS type, are used as stabilizers. Typical adhesion promoters are, for example, ethylene/acrylamide comonomers, polymeric isocyanates, reactive organosilicon compounds or phosphorous derivatives; silanes that contain hydrolyzable groups are also particularly suitable. Pigments can likewise be contained in small amounts. In total, the additives can be contained in the adhesive in an amount of up to 25 wt. %.

The adhesive composition may contain an additional flame retardant to further increase the flame retardancy of the cured adhesive. Such flame retardants can be phosphorus-containing flame retardants well known in the art.

While the reactive polyurethane prepolymer in the present invention has sufficient flame retardancy, it is not required to contain a significant amount of an additional flame retardant as a separate component to the reactive polyurethane prepolymer in the adhesive composition.

In one embodiment, the adhesive composition comprises, by weight of the composition, less than 5% by weight, preferably less than 1% by weight, more preferably less than 0.1% by weight an additional flame retardant. In a particular embodiment, the flame-retardant adhesive composition comprises no additional flame retardant.

The adhesive composition is storage stable and in liquid form at room temperature. The term "storage stable" means that no phase separation can be visually observed 90 days after the adhesive composition is prepared and kept at room temperature.

On yet another aspect, the present invention relates to the crosslinked/cured product of the adhesive composition. The crosslinked/cured product can be obtained by exposing the adhesive composition to moisture (for one-component adhesive system) or to a suitable polyol or amine hardener (for two-component adhesive system).

The crosslinked/cured product of the adhesive composition exhibits no burning dripping at 0.1 mm thickness in the UL 94 fire test.

Also, the crosslinked/cured product of the adhesive composition exhibits a tensile lap shear strength of larger than 10 MPa according to EN 302-1:2013, on beech wood, overlapping 250 $mm^2$ at 23° C.

Moreover, the crosslinked/cured product of the adhesive composition exhibits a block shear strength of no less than 80% compared to solid wood at 220° C. according to the DIN EN 17224:2019.

On yet another aspect, the present invention provides a method for the production of an article, the method comprising the steps of applying a polyurethane adhesive composition to the surface of a first substrate and connecting the surface of the first substrate to the surface of a second substrate, in which at least one of the surface are made of wood. Such substrates are used in the production of structural wood products such as finger-jointed sawn timber, glulam, laminated logs, cross laminated timber, plywood, and laminated veneer lumber.

The present invention will be explained in more detail with references to the following examples which are not to be understood as limiting the spirit of the invention.

EXAMPLES

Materials:

Polyisocyanates:

Desmodur VKS 5 is a mixture of diphenylmethane-4,4'-diisocyanate (MDI) with isomers and higher functional homologues commercially available from Covestro.

Desmodur VLR 10 is an aromatic polyisocyanate based on diphenylmethane diisocyanate (MDI) commercially available from Covestro.

Polyols:

Lupranol 4002 is an ethylene oxide modified polypropylene glycol commercially available from BASF.

Lupranol 2074 is polypropylene glycol commercially available from BASF.

Desmophen V155 is amine-based trifunctional polyether polyol commercially available from Covestro.

Flame Retardants:

Exolit OP550 is a polymeric phosphoric ester diol commercially available from Clariant.

Celltech 60 is 2,2-bis(chloromethyl)trimethylene bis(bis(2-chloroethyl)phosphate) commercially available from Cellular Technology.

Addiflam MHS is an ammonium polyphosphate coated with silane commercially available from CTF2000.

Additives:

Efka 3740 is a copolyacrylate based levelling agent commercially available from BASF.

Byk 067 A is a polysiloxane based defoamer commercially available from Byk Chemie.

DMDEE is 2,2'-dimorpholinodiethyl ether catalyst commercially available from Evonik.

Tinopal OB is a benzoxazole based optical brightener commercially available from BASF.

Testing Methods

Phosphorus and Chlorine Contents:

The phosphorus and chlorine contents in the polyurethane prepolymer were measured by ICP-MS.

Viscosity:

The viscosity of the polyurethane prepolymer was measured according to DIN EN ISO 2555:2000-01 using a Brookfield viscometer RV DV-II, spindle No. 6, 23° C., 10 pm).

Nco Content:

The NCO content of the polyurethane prepolymer was measured according to Spielberger, DIN EN ISO 11909:2007-05.

Appearance:

The appearance of the polyurethane prepolymer was visually observed 90 days after the preparation of the adhesive composition if a homogenous liquid or phase separation formed at room temperature.

Flame Test for Structural Bonded Wood Parts:

The samples were constituted of two wooden substrates bonded by a one-component adhesive composition. The upper substrate was 3.5×4×4 $cm^3$ and the lower one was 1×5×5 $cm^3$. A hole was drilled down to the top of the bond line. The samples were prepared from the bonded plates which were subsequently cut. The samples were stored at least one week at 25° C./65% RH prior to the flame test. In the flame test the samples were placed into the chamber and were fixed in a sample holder. The metal frame acting as weight and fire protection for the upper wood element was placed on the lower part. The assembly time was 10 min and the samples were pressed overnight with a pressure of 0.6 $N/mm^2$ for curing.

A thermocouple was placed into the drilled hole for measuring the temperature at the joint. A second thermocouple was placed around the top of the flame. The whole assembly was placed on the top of the burner and the burner was ignited. The time and the temperature when the bonding did fail were recorded. The result was evaluated as “Pass” if the time of bonding failure is more than 10 min, otherwise, it was evaluated as “Fail”.

UL 94 Fire Test:

The assembly sample having a size of 12.7 cm×1.5 cm and a thickness of 0.1 mm was evaluated according to UL 94 Fire Test. The result was evaluated if there was burning drip or not.

Tensile Lap Shear Strength:

The samples made of beech wood bonded with the adhesive compositions and having 250 $mm^2$ overlapping area were tested at 23° C. according to EN 302-1:2013.

Block Shear Strength:

The samples made of European spruce (size 45 mm×50 mm) having an overlapping area of 45×50 $mm^2$ were tested at 220° C. according the DIN EN 17224:2019. The values compared to solid wood were normalized to 100%.

Examples for Prepolymers and Adhesive Compositions

In a reaction vessel (1 L from Juchheim), Desmodur V155, VKS 5 and VLR 10 were filled and under stirring the other ingredients were added according to the formulations in Tables 1 and 2. The mixture was stirred for 2 hours at 70° C. under vacuum. After the targeted NCO value was reached, the mixture was cooled down to room temperature to obtain the prepolymers (Examples 1 to 3 and Comparative Examples 1 to 5). Then the additives and catalysts according to the formulations in Table 3 were mixed into the prepolymers using a speed mixer (from Hauschild) at 2500 rpm to obtain the adhesive compositions (AC 1 to AC 8).

The test results of the phosphor content, viscosity, NCO content and appearance of the flame-retardant NCO-terminated prepolymer are shown in Tables 1 and 2.

The test results of the flame retardancy, tensile lap shear strength at 23° C. and block shear strength at 220° C. are shown in Table 3.

TABLE 1

| Formulations of prepolymers according to the invention (by weight parts) and test results | | | |
|---|---|---|---|
| Component | Example 1 | Example 2 | Example 3 |
| Lupranol 4002 | 20.0 | 19.0 | 19.0 |
| Lupranol 2074 | 16.72 | 15.72 | 15.3 |
| Exolit OP550 | 4.20 | 6.70 | 8.05 |
| Desmophen V155 | 0.25 | 0.25 | 0.25 |
| Desmodur VKS 5 | 29.39 | 28.56 | 28.18 |
| Desmodur VLR 10 | 29.39 | 29.56 | 28.18 |
| P content (wt %) | 0.70 | 1.10 | 1.40 |
| Viscosity@23° C. (mPas) | 7500 | 6200 | 5800 |
| NCO content (%) | 16.2 | 15.8 | 16.1 |
| Appearance | Liquid | Liquid | Liquid |

TABLE 2

| Formulations of prepolymers not according to the invention (by weight parts) and test results | | | | | |
|---|---|---|---|---|---|
| Formulation | Com. Ex. 1 | Com. Ex. 2 | Com. Ex. 3 | Com. Ex. 4 | Com. Ex. 5 |
| Lupranol 4002 | 21.0 | 24.0 | 23.0 | 21.0 | 15.0 |
| Lupranol 2074 | 17.1 | 19.64 | 18.6 | 17.1 | 12.4 |
| Exolit OP550 | 1.70 | — | — | — | 12.3 |
| Celltech 60 | — | — | 3.0 | — | — |
| Addiflam MHS | — | — | — | 10.0 | 10.0 |
| Desmophen V155 | 0.26 | 0.3 | 0.3 | 0.2 | 0.24 |
| Desmodur VKS 5 | 30.02 | 28.05 | 27.35 | 25.78 | 30.0 |
| Desmodur VLR 10 | 30.02 | 28.05 | 27.35 | 25.78 | 30.0 |
| P content (wt %) | 0.3 | — | 0.3 | 3.0 | 2.0 |
| CI content (wt %) | — | — | 0.9 | — | — |
| Viscosity@23° C. (mPas) | 6900 | 8500 | 4900 | 7200 | 10000 |
| NCO content (%) | 16.0 | 16.6 | 16.6 | 16.2 | 16.1 |
| Appearance | Liquid | Liquid | Liquid | Phase separation | Liquid |

TABLE 3

| Formulations of the adhesive compositions (by weight parts) and test results | | | | | | | | |
|---|---|---|---|---|---|---|---|---|
| Formulation | AC 1 | AC 2 | AC 3 | AC 4 | AC 5 | AC 6 | AC 7 | AC 8 |
| Example 1 | 100 | — | — | — | — | — | — | — |
| Example 2 | — | 100 | — | — | — | — | — | — |
| Example 3 | — | — | 100 | — | — | — | — | — |
| Com. Ex. 1 | — | — | — | 100 | — | — | — | — |
| Com. Ex. 2 | — | — | — | — | 100 | — | — | — |
| Com. Ex. 3 | — | — | — | — | — | 100 | — | — |
| Com. Ex. 4 | — | — | — | — | — | — | 100 | — |
| Com. Ex. 5 | — | — | — | — | — | — | — | 100 |
| Efka 3740 | 0.17 | 0.17 | 0.16 | 0.17 | 0.19 | — | — | 0.16 |
| Byk 067 A | 0.02 | 0.02 | 0.02 | 0.02 | 0.02 | 0.02 | 0.02 | 0.02 |
| DMDEE | — | — | 0.08 | — | 0.35 | 0.33 | 0.11 | 0.11 |
| Tinopal OB | 0.01 | 0.01 | 0.01 | 0.01 | 0.01 | 0.01 | 0.01 | 0.01 |
| Flame test | Pass | Pass | Pass | Fail | Fail | Pass | Pass | Pass |
| UL 94 fire test | No dripping | No dripping | No dripping | Dripping | Dripping | No dripping | No dripping | No dripping |
| Tensile lap shear Strength (MPa) | >10 | >10 | >10 | >10 | >10 | <7 | >10 | >10 |
| Block shear strength@220° C. (%) | 100 | 90 | — | 100 | 100 | 95 | 95 | 45 |

As can be seen, the prepolymers prepared in the inventive examples having suitable amount of phosphor exhibited an excellent balance of flame retardancy and the required properties as adhesive compositions used for structural bonding of wood materials such as viscosity, storage stability and tensile strength and heat resistance. The adhesive compositions having the prepolymers of comparative examples 1 and 2 could not pass the flame test due to a lower amount or no phosphor incorporated in the prepolymer. The adhesive compositions having the prepolymer of comparative example 3 exhibited poorer bonding strength to the wood substrates. In addition, environmental concerns could be taken in view of the presence of chlorine in the adhesive. The adhesive compositions having the prepolymer of comparative example 4 appeared in phase separation due to segmentation of the flame retardant, and thus could not be easily applied. Moreover, the adhesive composition having the prepolymer of comparative example 5 with an overly high phosphorus content from the polymeric phosphoric ester diol exhibited significantly increased viscosity and a poorer heat resistance when the block shear strength was tested at 22000.

The invention claimed is:

1. A flame-retardant adhesive composition comprising:

a reactive polyurethane prepolymer comprising:

at least one isocyanate end group; and at least one divalent phosphonic or phosphoric ester group, wherein the polyurethane prepolymer has a viscosity of from 1000 mPas to less than 10000 mPas, determined at 23° C. according to DIN EN ISO 2555:2000-01, and wherein the phosphor content of the polyurethane prepolymer is greater than 0.3 wt % and less than 2.0 wt %, based on the total weight of the polyurethane prepolymer; and at least one additional flame retardant present in an amount of less than 5 wt %, based on the total weight of the flame-retardant adhesive composition.

2. The composition of claim 1, wherein the at least one divalent phosphonic and the phosphoric ester group are each independently selected from the group consisting of Formulae (1) and (3), (1)

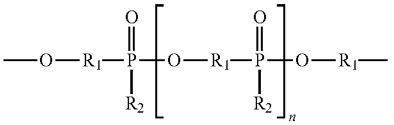

wherein n is an average chain length of from 0 to 10, $R_2$ is $CH_3$, $CH_2CH_3$, $CH_2CH_2CH_3$, $CH_2(CH_3)_2$, $CH_2(CH_2)_2CH_3$, $CH_2CH(CH_3)_2$, $C(CH_3)_3$, $C_6H_5$, $CH_2—C_6H_5$, $OCH_3$, $OCH_2CH_3$, $O(CH_2)_2CH_3$, $OCH(CH_3)_2$, $O(CH_2)_3CH_3$, $OCH_2CH(CH_3)_2$, $OC(CH_3)_3$, $O—C_6H_5$, or $O—CH_2—C_6H_5$, and $R_1$ is a moiety of Formula (2), (2)

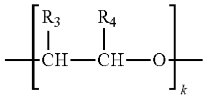

wherein k is an average chain length of from 1 to 5, and $R_3$ and $R_4$, independently of one another, are H, $CH_3$, $CH_2CH_3$, $CH_2CH_2CH_3$, $CH(CH_3)_2$, $CH_2(CH_2)_2CH_3$, $CH_2CH(CH_3)_2$, $C(CH_3)_3$, $C_6H_5$, or $CH_2—C_6H_5$; and (3)

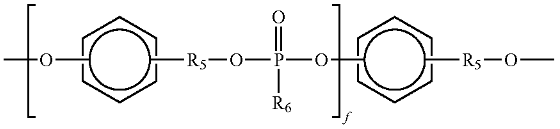

wherein f is an average chain length of from 1 to 10, $R_6$ is $CH_3$, $CH_2CH_3$, $CH_2CH_2CH_3$, $CH_2(CH_3)_2$, $CH_2(CH_2)_2CH_3$, $CH_2CH(CH_3)_2$, $C(CH_3)_3$, $C_6H_5$, $CH_2—C_6H_5$, $OCH_3$, $OCH_2CH_3$, $O(CH_2)_2CH_3$, $OCH(CH_3)_2$, $O(CH_2)_3CH_3$, $OCH_2CH(CH_3)_2$, $OC\ (CH_3)_3$, $O—C_6H_5$, or $O—CH_2—C_6H_5$, and $R_5$ is a single bond, $CH_2$, $CH_2CH_2$, $CH_2CH_2CH_2$, $CH(CH_3)_2$, $CH_2(CH_2)_2CH_2$, $CH_2CH(CH_3)_2$, $C_6H_4$, $CH_2—C_6H_4$, or $C(CH_3)_2—C_6H_4$.

3. The composition of claim 1, wherein the phosphor content of the polyurethane prepolymer is from 0.5 wt % to 1.8 wt %, based on the total weight of the polyurethane prepolymer.

4. The composition of claim 1, wherein the polyurethane prepolymer further comprises at least one residual group of polyol having no phosphor.

5. The composition of claim 1, wherein the polyurethane prepolymer has a molecular weight of from 300 g/mol to 20000 g/mol.

6. The composition of claim 1, wherein the polyurethane prepolymer has NCO content of from 5 wt. % to 25 wt. %, as determined according to DIN EN ISO 11909:2007-05.

7. The composition of claim 1, wherein the polyurethane prepolymer is obtained by reacting:

a polyisocyanate compound;

a non-phosphor containing polyol; and a phosphonic or phosphoric ester having at least one hydroxyl group.

8. The composition of claim 1, further comprising one or more additives selected from the group consisting of levelling agents, fillers, defoamers, blowing catalysts, optical brighteners, adhesion promoters, crosslinking agents, pigments, stabilizers, rheology modifiers, and antioxidants.

9. The composition of claim 8, wherein the one or more additives are present in an amount of up to 25 wt %, based on the total weight of the flame-retardant adhesive composition.

10. The composition of claim 1, wherein the at least one additional flame retardant is present in an amount of less than 1 wt %, based on the total weight of the flame-retardant adhesive composition.

11. The composition of claim 10, wherein the at least one additional flame retardant is present in an amount of less than 0.1 wt %, based on the total weight of the flame-retardant adhesive composition.

12. A cured or crosslinked product comprising the flame-retardant adhesive composition of claim 1.

13. The product of claim 12, wherein the product exhibits no burning drips at 0.1 mm thickness in the UL 94 fire test.

14. The product of claim 12, wherein the product exhibits a tensile lap shear strength of greater than 10 MPa, as determined according to EN 302-1:2013.

15. A method for producing an article, the method comprising:

applying the composition of claim 1 to a surface of a first substrate, and joining the surface of the first substrate to a surface of a second substrate to create the article, wherein at least one of the first substrate or the second substrate is made of wood.

16. The method of manufacture of claim 15, wherein the article is a structural wood product.

* * * * *